(12) United States Patent
Germiquet et al.

(10) Patent No.: US 6,791,903 B2
(45) Date of Patent: Sep. 14, 2004

(54) ELECTRONIC DIVING WATCH WITH ANALOG DISPLAY

(75) Inventors: Christophe Germiquet, Prêles (CH); Jean-Jacques Born, Morges (CH); Vincent Berseth, Neuchâtel (CH)

(73) Assignee: Asulab S.A., Marin (CH)

( * ) Notice: Subject to any disclaimer, the term of this patent is extended or adjusted under 35 U.S.C. 154(b) by 0 days.

(21) Appl. No.: 10/649,718

(22) Filed: Aug. 28, 2003

(65) Prior Publication Data

US 2004/0047242 A1 Mar. 11, 2004

(30) Foreign Application Priority Data

Sep. 4, 2002 (CH) ............................................ 1511/02

(51) Int. Cl.⁷ .......................... G04B 47/06; G04B 19/04
(52) U.S. Cl. ............................ 368/11; 368/80; 368/223
(58) Field of Search ............................... 369/10, 11, 80; 369/82, 223

(56) References Cited

U.S. PATENT DOCUMENTS

| | | | |
|---|---|---|---|
| 4,783,772 A | * 11/1988 | Umemoto et al. | ............ 368/11 |
| 4,882,678 A | 11/1989 | Hollis et al. | |
| 4,949,072 A | 8/1990 | Comerford et al. | |
| 5,189,646 A | 2/1993 | Sako et al. | |
| 5,357,488 A | * 10/1994 | Udo et al. | ..................... 368/11 |
| 5,802,016 A | * 9/1998 | Kubota et al. | ................ 368/11 |
| 6,490,230 B1 | * 12/2002 | Sakuyama et al. | ............ 368/11 |

FOREIGN PATENT DOCUMENTS

| | | |
|---|---|---|
| CH | 495 576 | 8/1970 |
| WO | WO 00 68743 A1 | 11/2000 |

* cited by examiner

Primary Examiner—Vit W. Miska
(74) Attorney, Agent, or Firm—Sughrue Mion, PLLC

(57) ABSTRACT

An electronic diving watch (1) with an analog display is described, comprising bidirectional driving means respectively of an hour hand (11) and a minute hand (12). The watch has a diving operating mode in which the display hands of the current time are likewise used in order to display data relating to the dive. More precisely, the hour hand (11) is used for the indication of information which is vital for the wearer of the watch, i.e. either that his body has not been subjected to physiological modifications which are significantly substantial enough for him to be required to observe a decompression stage during the ascent, or the parameters of the stage(s) to be effected, if need be. Liquid crystal screens (14, 15) are furthermore provided in order to display complementary information.

22 Claims, 4 Drawing Sheets

ELECTRONIC DIVING WATCH WITH ANALOG DISPLAY

The present invention relates to an electronic watch comprising functions which are dedicated to the implementation of diving. More precisely, the diving watch according to the present invention is of the type comprising a sealed housing containing a clock movement which is surmounted by a dial, the watch comprising at least first graduations, said clock movement comprising electronic circuits which are able to produce time signals intended for motor means which control respectively at least a first and a second analog display organs, said display organs being disposed above the dial in order to display the current time in a first time operating mode, the watch comprising furthermore a pressure sensor which is able to produce electrical signals which are representative of the surrounding pressure and to supply said signals to said electronic circuits, the diving watch having at least a second operating mode, or diving mode, in which a display of data relating to the practise of diving is provided.

Similar products have already been described in the prior art. The patent U.S. Pat. No. 4,783,772 in particular describes an analog electronic watch provided with a pressure sensor which permits it to display data relating to the practise of diving. These data, and also information relating to additional functions, such as an alarm for example, are displayed on an additional liquid crystal screen, disposed on a twelve-hour basis on the dial of the aforementioned watch.

In any event, the nature of the information available on the described product is limited to information of the type of the momentary depth, duration of the dive in progress, maximum depth attained. As a result, the use of this information in safety terms requires using independent decompression tables in order to define the parameters of the ascent, in particular the determination of the maximum duration during which the user can remain submerged before having to effect at least one decompression stage.

Likewise, no information is given with respect to the decompression stages to be effected possibly during the ascent from a dive. Furthermore, the readability of the liquid crystal screen is limited due to its small size, in particular in underwater conditions.

A first object of the present invention is to reduce the previously mentioned disadvantages of the prior art by making available a diving watch which indicates to its user information relating to his safety during his dive.

Another object of the invention is to propose a diving watch which permits its user to observe the aforementioned information very easily, in other words to produce a diving watch which has good readability of this information.

With this object, the invention provides in particular a diving watch of the type indicated previously, characterised by the fact that said first graduations serve in particular for indicating a depth, in that said electronic circuits comprise first means for controlling the first analog display organ, in said diving mode, in order to indicate the momentary depth in conjunction with said first graduations, and in that said electronic circuits likewise comprise second means which are able to define almost continually a minimum depth which is not to be exceeded by the wearer of the watch during the ascent from a dive, calculated from a substantially continuous decompression algorithm, and to control said second analog display organ in order to indicate said depth which is not to be exceeded in conjunction with said first graduations substantially in real time.

It is likewise provided that the second means of the electronic circuits are furthermore able to define discontinuous decompression parameters comprising at least one stage to be effected during the ascent from a dive, calculated from the algorithm, a stage being in particular defined by its depth and its duration, and to control sequentially the second display organ, in the diving mode, in order to indicate, in the first instance, the depth of at least one stage to be effected during the ascent in conjunction with said first graduations and in order to indicate, in the second instance, that the diver can resurface.

In the case of a plurality of decompression stages to be observed during the ascent from a dive, means are provided in order to control the second display organ in order to indicate their respective depths in a sequential manner, which will be described in detail subsequently in the present application.

It is important to note that, insofar as the display of the data relating to the depth is produced by analog display organs which are used normally for displaying the time, excellent readability is ensured. Furthermore, as regards the adopted structure, relative reading of the respective positions of the display organs is possible and gives a certain synergy. Indeed, during the ascent from a dive, the second display organ is positioned at the depth of the deepest decompression stage to be effected, the first display organ indicating the momentary depth.

The determination of the parameters of the respective decompression stages is produced on the basis of diverse algorithms obtained following numerous medical studies related to the study of decompression of gases in the human body. The choice of algorithm is of little importance either for understanding of the present invention or for its implementation by the person skilled in the art, who will be able to choose an algorithm from the most recent which are generally recognised in the sphere of diving.

It will be possible for example to use an algorithm based on the models of Haldane, Bühlmann or even on one of their variants, taking into account microbubbles, such as for example Yount's VPM ("Varying Permeability Model") or Wienke's RGBM ("Reduced Gradient Bubble Model") models.

These algorithms also permit decompression of the gases dissolved in the body of the diver to be effected during the dive in a continuous manner, in other words without effecting a decompression stage but observing particular conditions of ascent. With this object, these algorithms define a minimum pressure continually, from which one can deduce a minimum depth to which the diver can be exposed without putting himself in danger dependent upon his physiological state.

Thus, whichever type of algorithm is adopted for the production of the watch according to the invention, the diver can easily verify that he is at a depth which presents no danger to his health by a simple reading of the relative positions of the two display organs. The diver must bear in mind, during his ascent, that the position of the first display organ must not rise, in the anticlockwise direction of rotation, beyond the position of the second display organ. This reading is advantageous insofar as it is more intuitive than the reading of an indication placed on a dial above which a display organ is situated. Likewise, this reading is more intuitive than the reading of two distinct pieces of information which are displayed on one or two liquid crystal screens and must be correlated.

In general, means are provided in order to actuate, from the time operating mode, a diving operating mode in an automatic manner. It is obviously possible to use actuation of the manual type for this last operating mode, for example by pressing a push button.

In a preferred embodiment of the present invention, means are provided for controlling the minute hand in order to display the depth substantially in real time, and the hour hand in order to display the information relating to the dive, in particular that which relates to the safety of the wearer of the watch or diver.

The watch according to the invention preferably has second graduations comprising at least a first zone which permits an indication to the diver, in conjunction with the hour hand, that his body is undergoing minor physiological modifications with respect to his normal state, these modifications being related to the performance of diving. It is obvious that this scenario applies when the diver is at the surface after having ascended from a dive or when he is at the start of a dive, the history of which, in terms of depth and duration, does not require that a decompression stage be effected during the ascent.

In particular, means are provided for positioning the hour hand in the first zone of additional graduations in order to indicate to the wearer of the watch the value of the altitude which must not be exceeded after the dive in progress, this value being dependent upon the above-mentioned physiological modifications. Furthermore, the position of the hour hand relative to the ends of the first zone, during the dive, can permit the diver to assess approximately the maximum remaining duration before having to effect a decompression stage during the ascent.

Indeed, as long as the diver does not descend more than a few meters in depth, he can stay submerged for several hours without having to respect a decompression stage during the ascent, assuming that the dive in progress is the first for at least about ten hours. Means are provided for measuring the surrounding pressure and linking these pressure measurements to the time and for deducing therefrom, by calculations based on an algorithm, the maximum duration remaining without having to effect a decompression stage during the ascent.

In a preferred variant, the diving watch according to the present invention comprises at least one external control member and at least one liquid crystal display screen, preferably two. Means are likewise provided for controlling these liquid crystal screens in order to permit the indication of additional information to the diver, the nature of this information varying with the operating modes.

It is likewise provided to implement a third operating mode, or historical mode, which is accessible by operating a control member from the time function. In the historical mode, means can be provided for actuating the hour and minute hands to reproduce their actions from one of the last dives at an accelerated rate. It can likewise be provided to display, on the two liquid crystal screens, respectively the maximum depth attained and the total duration of the dive.

The invention will be understood more easily with reference to the following description of various embodiments with reference to the attached drawings, in which.

Figure 1:
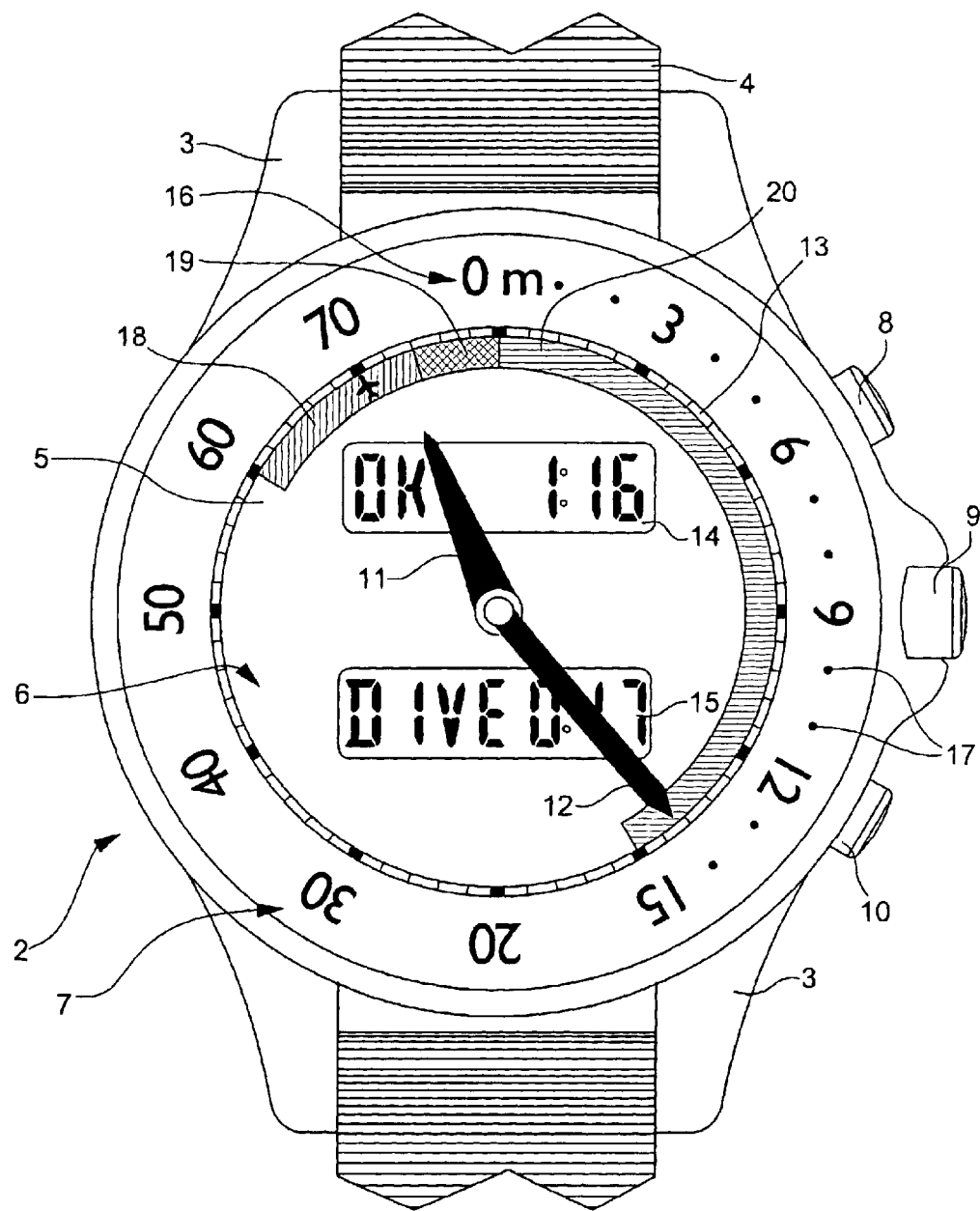
FIG. 1 is a front view of the diving watch, in a first state, according to a preferred embodiment of the present invention.
Figure 2:
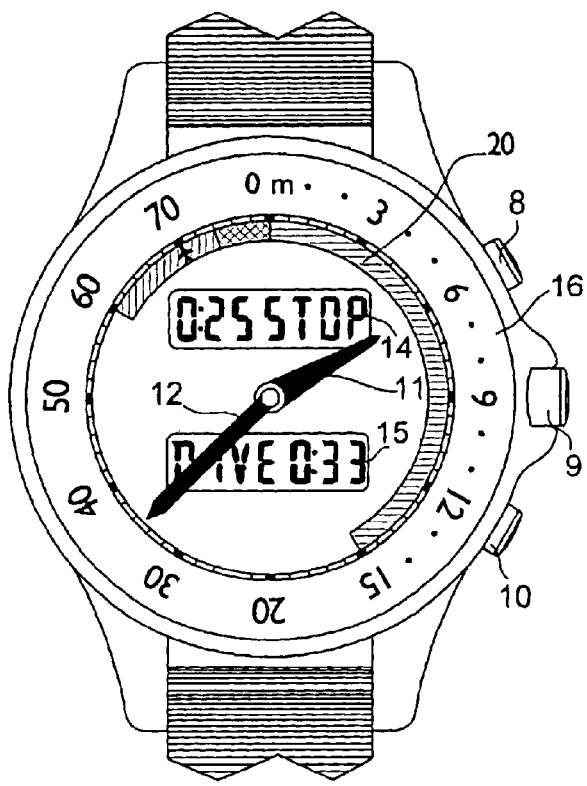
FIG. 2 is a front view of the diving watch, in a second state, according to a preferred embodiment of the present invention.
Figure 3:
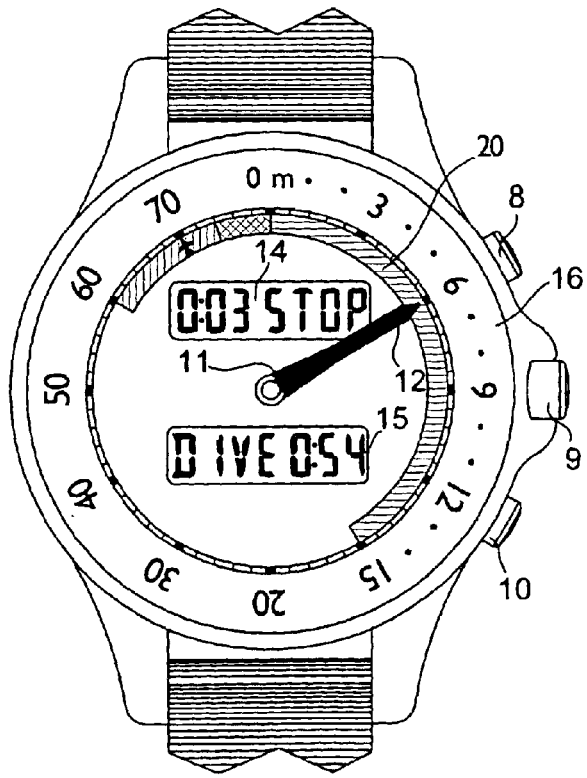
FIG. 3 is a front view of the diving watch, in a third state, according to a preferred embodiment of the present invention.

FIGS. 1 to 3 represent the diving watch 1 according to the present invention in a preferred embodiment, the watch being in a operating mode relating to the practise of diving, in other words in the diving mode. These Figures represent the appearance of the watch 1 at different phases of the same dive, taken in chronological order. FIG. 1 corresponds to an only slightly advanced phase of the dive, while FIG. 2 corresponds to a more advanced phase of this same dive, FIG. 3 corresponding to the ascent.

As appears in FIGS. 1 to 3, the watch 1 looks like a watch of a conventional type. It has a housing 2 which can be of the metallic type for example comprising a middle on which a back cover is screwed or maintained by friction. The housing 2 comprises horns 3 which are provided for the attachment of a bracelet 4 and contain in particular a clock movement (not shown), a dial 5 and closed on its upper face by a glass 6, carrying a fixed bezel 7 on its periphery, the bezel being integral with the body. In standard fashion, external control members are provided in the form of three lateral push buttons 8, 9 and 10.

For analog display of the time, hour 11 and minute 12 hands are provided which cooperate with a standard time graduation 13 on the dial. These hands 11 and 12 are used also for displaying other indications as will be described subsequently.

Furthermore, the watch 1 comprises two liquid crystal screens or displays (LCD) 14, 15, placed preferably under transparent windows of the dial 5 and intended to display diverse information, mentioned subsequently, in alphanumeric form, even possibly graphic form. It is obvious that the watch can be provided with a single LCD screen and possibly that the latter covers substantially the entire surface of the dial 5.

Given that the present invention relates substantially to the means used in order to provide information relating to the practise of diving, the other functions of the watch will not be described in detail here. In any event, it is conceivable to provide other functions, for example a chronograph, an alarm, an indication of the end of the battery life, a radio-controlled setting of the time, reception of messages by radio (paging), etc. Furthermore, illumination means are provided at least in order to illuminate the LCD screens 14 and 15, and possibly the dial 5, these means being actuated for example in response to an operation on one of the control members 8, 9 or 10 of the watch.

The bezel 7 carries specific graduations 16 which are used in the diving mode in order to indicate a depth, preferably of 0 to 70 meters. It may be noted that reference points 17 are provided on the bezel 7, between the depths 0 and 15 meters, in order to facilitate a precise reading of the depth in this range.

The dial has furthermore additional graduations subdivided into three adjacent zones, preferably identified by different colours. The first zone 18 extends, in the clockwise direction, between the positions of the time graduations corresponding respectively to 50 minutes and 57 minutes, the second zone 19 extends between the positions 57 minutes and 60 minutes and the third zone 20 is situated between the positions 60 and 25 minutes, these last positions corresponding respectively to the depths 0 and 15 meters.

The use of these diverse indications in order to display information relating to diving is disclosed in detail below.

The watch 1 comprises particular technical means, which will be quickly described later in relation to FIG. 4, which permit it to provide vital indications for its wearer in the framework of the performance of diving. These technical means comprise in particular a pressure sensor 21 which permits continual measurement of the pressure of the surroundings of the watch 1 and conversion of this latter value into depth in the framework of diving.

This type of construction and the calculations effected in order to utilise the measurements of the pressure sensor have been described in numerous documents of the prior art and will not be dealt with in more detail in the following. In particular, it will be possible to consult the patent U.S. Pat. No. 4,783,772, mentioned earlier, in which embodiments of the aforementioned aspects are provided.

Likewise, the construction of the watch 1 according to the present invention, more particularly as far as its movement is concerned, will not be disclosed in more detail here, insofar as such movements have already been described in the prior art. Indeed, it is possible to consult, by way of example, European patent No. 0 589 353 which describes the embodiment of an analog electronic watch, the hour and minute hands of which are controlled by independent motors. In particular, this European patent describes how to use the hour and minute hands in order to display information other than the hour and the minute.

Conventional means are provided in order to effect a change of operating mode automatically, in particular in order to change from the time mode to a second operating mode, named diving mode, when a dive is started. These means permit conversely a return to the time mode automatically from the diving mode when the diver, the wearer of the watch 1, resurfaces. With this object, it is possible for example to resort to the use of two ohmic contacts (not shown), each of which has a part situated on the exterior of the housing 2 of the watch 1, this external part coming thus into contact with the water during a dive. These two contacts thus form a switch, which is open when the watch 1 is out of the water and closed when it is immersed in the water. The closure of this switch causes the automatic actuation of the change into diving mode. Another possible embodiment for detecting immersion of the watch resides in disposing at least one electrode in the glass of the watch so as to form a condenser with variable capacitance with the upper surface of the glass, permitting detection of the presence of water on the glass. The use of signals provided by the pressure sensor 21 is likewise conceivable, either in an alternative manner relative to that which has just been described or in a complementary manner, in order to lock or unlock the diving mode. In this case, the electronic circuits of the watch can be adapted in order to actuate the diving mode in response to the detection of an increase in the surrounding pressure beyond a predefined value.

Obviously, it is possible to provide, in an alternative form or in a complementary manner, manual actuation means for the diving mode, of a conventional type.

These means, automatic or manual, will not be dealt with further in the present patent application insofar as they do not form the core of the present invention.

Once the diving mode is actuated, the respective functions associated with the hour 11 and minute 12 hands are the display of information relating in particular to possible stages to be effected during the ascent from the dive in progress and the display of the momentary depth.

Thus, when the diver enters the water, which actuates the diving mode, the two hands 11 and 12 are positioned respectively at the start of the first zone 18 of the additional graduations, in the framework of a "first dive", and at twelve o'clock, i.e. at the start of the first graduations 16. By "first dive" it is to be understood a dive effected when the body of the diver does not undergo any physiological modification due to the practise of diving. Thus, this expression possibly encompasses dives accomplished a sufficiently long time after previous dives for the body of the diver to have recuperated.

When the diver descends, the minute hand 12 begins to turn in the clockwise direction in order to indicate the value of the momentary depth with respect to the first graduations, whilst initially the hour hand 11 turns in the clockwise direction opposite the first zone 18 of the additional graduations.

Generally, the maximum remaining duration, without having to effect a decompression stage during the ascent, initially shows a very high value, in the framework of a first dive, this value decreasing in a significant fashion when the diver descends below several meters in depth. Means are provided in order to measure and store the surrounding pressure as a function of the time and in order to control the hour hand 11 in order to cause it to turn just into the second zone 19 of the additional graduations, in order to indicate to the diver that the maximum remaining duration is decreasing in a significant fashion.

Reading of the information provided by the position of the hour hand 11 with respect to the first and second zones 18 and 19 of the additional graduations corresponds to an indication of the minimum surrounding pressure to which the diver can be exposed after the dive in order not to risk any health problems. This indication is produced in the form of an altitude which is not to be exceeded, two successive graduations corresponding to altitudes 500 meters apart. It is noted that a symbol representing an aeroplane is situated opposite the graduation corresponding to an altitude of 2500 meters. It is acknowledged, indeed, that during a commercial flight, the body of an aeroplane passenger is subjected to an environmental pressure equivalent to the pressure prevailing around 2000 to 2500 meters in altitude.

Generally, the maximum altitude which is not to be exceeded and the maximum remaining duration before requiring to effect a decompression stage during the ascent are linked in a more or less complex manner. Thus, whatever algorithm is adopted for programming the watch, the maximum remaining duration before requiring to effect a decompression stage decreases progressively when the diver remains immersed below a depth of the order of a few meters, the rate of decrease increasing with the depth. On the other hand, the maximum remaining duration stabilises then increases as soon as the diver moves towards decreasing depths.

It may be noted that the value of the remaining duration reaches zero when the altitude which is not to be exceeded reaches zero (in the case of a dive at sea where the altitude of the surface is zero). Thus, an experienced user can evaluate the relationship of the value of the remaining duration with respect to the position of the hour hand 11 in relation to the end of the second zone 19.

Thus, in the situation represented in FIG. 1, the diver is at a depth of 14 meters, which is indicated by the position of the minute hand 12 with respect to the first graduations 16. The position of the hour hand 11 opposite the first zone 18, at that instant, indicates to him that he will not be able to travel by aeroplane immediately after the dive in progress insofar as his body has undergone significant physiological modifications and insofar as the altitude which is not to be exceeded is consequently of the order of 2000 meters.

Furthermore, it can be ascertained in FIG. 1 that the LCD screens 14 and 15 are advantageously used in order to supply additional information to the diver.

Indeed, it is provided in this embodiment to control the screen 14 in such a manner that it displays the exact value of the maximum remaining duration before a stage, i.e. 1 hour 16 minutes in the situation illustrated. In this way, the diver can estimate his situation by a first quick reading of the approximate position of the hour hand 11 opposite the additional graduations. In any event, when the diver wishes to obtain more precise information about the situation, as here the exact value of the maximum remaining duration, this is available simultaneously on the screen 14.

Likewise, the screen 15 is used in order to display, in the normal diving situation, the elapsed duration of the dive in progress, which is equal to 17 minutes in the situation in FIG. 1.

It may be noted that if the diver ascends, the hour hand 11 can be controlled to be turned in the anticlockwise direction opposite the first zone 18, in order to indicate that the altitude which is not to be exceeded is progressively increasing.

When the maximum remaining duration attains a zero value, decompression stages have to be effected by the diver during the ascent. Such a situation is illustrated in FIG. 2.

In FIG. 2, the diving watch 1 according to the present invention indicates to the diver that he is situated at a depth of 35 meters and that the duration of the dive in progress has increased to 33 minutes, this information being provided respectively by the minute hand 12 and by the screen 15. The hour hand 11 indicates opposite the first graduations 16 and the third zone 20 of additional graduations, that furthermore decompression stages will be required during the ascent, a first of these stages, i.e. the deepest, being situated at a depth of 6 meters.

It is likewise noted that the indication of the screen 14 is different from that described in relation to FIG. 1. Indeed, as the maximum remaining duration before requiring to effect a decompression stage is zero, it is no longer necessary to display it. For this reason, the screen 14 then displays information which is of interest in the framework of a dive with stages, i.e. the total duration of the decompression stages to be effected. In the situation in FIG. 2, the watch 1 thus indicates to the diver that the total duration of the decompression stages which he must effect is 25 minutes.

Obviously, it is provided that the electronic circuits of the diving watch according to the present invention constantly deal with data transmitted by the pressure sensor 21, so as to update the information supplied to the diver almost in real time.

FIG. 3 illustrates a situation which corresponds to the last phase of a dive, i.e. the ascent and in particular the monitoring of the decompression stages.

It is noted in this Figure that the diver is at a depth of 6 meters and that the dive has lasted 54 minutes. Furthermore, the hour hand 11 is situated opposite the graduation 6 meters, just as the minute hand 12, which indicates that the diver is in the process of effecting a decompression stage at a depth of 6 meters. The screen 15 indicates in this case the duration of the decompression stage in progress, which here is 3 minutes.

The superposition of the hour 11 and of the minute 12 hands during a decompression stage makes an advantageous contribution to the diving watch according to the present invention. Indeed, as the hour hand 11 indicates, during the ascent, the depth of a next decompression stage to be effected and the minute hand 12 indicates the momentary depth, the latter are logically superposed when the diver must effect a decompression stage at the depth at which he is situated. Thus, the diver knows, by a quick and simple reading of the relative positions of the two indication hands 11 and 12 that he is at the proper depth for effecting the stage. It is likewise provided to produce the hour 11 and minute 12 hands in such a manner that they have different respective visual appearances in order to improve their differentiation during a quick reading. The use of different colours for the two hands can be imagined for example. Likewise, the dial 5 of the watch preferably has a visual appearance which permits an increased contrast for the visibility of the hands 11 and 12 to be obtained with respect to the dial.

Furthermore, the advantageous disposition which has just been described presents an additional advantage in that it permits the diver to access to information which is extremely important for his safety with very great readability. Indeed, while he ascends, before the first decompression stage or between two decompression stages, the diver can consider his situation by simple sidelong glances in order to evaluate the relative positions of the hour 11 and the minute 12 hands. During an ascent, by observing appropriate safety measures, the minute hand 12, turning in the anticlockwise direction must in no event take up a position situated at a depth level less than that corresponding to the position of the hour hand 11. Such a situation would indicate that a decompression stage had not been observed by the diver during the ascent, which would expose him to grave danger.

It can likewise be provided to produce the three zones 18, 19 and 20 of the additional graduations in different colours, respectively green, orange and red, in order to indicate an increasing danger in that order.

It is obvious that additional means permitting actuation of an audible alarm can be provided, in order to warn the diver in the event of non-observance of a decompression stage, such as that already described in the prior art in relation to diving computers.

Starting from the situation represented in FIG. 3, it is provided that the electronic circuits of the watch, briefly described further on, detect by a suitable program that the diver has correctly effected the decompression stage at 6 meters, in particular by means of calculations effected on the basis of the decompression algorithm which is used. Once said stage is correctly effected, the hour hand 11 is moved to the position of 3 meters, either by a jump or in a continuous manner, for example, indicating to the diver a recommended rate of ascent, by an adapted rotational speed. Indeed, it is known in the sphere of diving that, during the ascent, the diver must preferably limit his rate of ascent below a limiting value, generally of the order of 10 meters per second.

Likewise, the electronic circuits of the watch verify that the diver correctly effects the stage at 3 meters, after which the hour hand 11 is displaced on the end of the second zone 19 of the additional graduations, indicating to the diver that he can resurface in complete safety.

It can also be provided that the diving mode is automatically deactuated at the end of a certain elapsed time at the surface, the hour hand 11 and the minute hand 12 taking up their ordinary functions in the time mode again.

A third operating mode is provided, actuated from the time mode by pressure on a first of the push buttons 10, for example. In this operating mode, the minute hand 12 indicates the maximum depth attained during the last dive in an analog manner, whilst the screen 14 indicates this maximum depth in a numerical manner, the screen 15 indicating the total duration of the last dive.

In addition, it is provided that, in the third operating mode, or generally in response to an action on one of the push buttons 8 to 10 from the time mode, the hour hand 11 provides the diver with information relating to certain physiological modifications possibly undergone by his body as a result of the performance of diving. In the case where the last dive(s) are recent, such modifications are still present and the hour hand 11 is situated then opposite the first zone 18 or the second zone 19 of the additional graduations so as to indicate the altitude which the diver must not exceed as a result of these modifications. Such an indication is of interest in particular in the case where the diver wishes to make an aeroplane journey shortly after having implemented the dive. Indeed, the reduction in pressure undergone by the body of the diver during an aeroplane journey can lead to a decompression accident if the aforementioned modifications have not diminished sufficiently. The aeroplane symbol, situated in the first zone 18, is thus provided in order to remind the diver of the existence of this risk. Thus, there can likewise be a display provided, on at least one of the LCD screens 14, 15, of the remaining duration before being able to travel by aeroplane when the physiological modifications are still significant. Once the modifications have once again become negligible, the hour hand 11 is positioned opposite the start of the first zone 18, in order to indicate to the diver that there is no longer any danger. In this case, an indication can likewise be provided upon at least one of the LCD screens 14, 15, in order to indicate to the user of the watch that he can once again travel by aeroplane.

A return to the time mode, automatic or obtained by renewed pressure on the first push button 10, can then be provided.

On the other hand, there can even be provided means for storing the parameters of the first dive and that a second pressure on the first push button 10, within a short time interval after the first pressure for example, actuates an additional operating mode, named historical mode. Likewise, it can be provided that the electronic circuit of the watch 1 comprises adequate memory for storing the logs or parameters of the last five or ten dives, for example. In this case, it can be provided that a long pressure on one of the push buttons 8 to 10, from the time mode, causes change into historical mode of the parameters of the last dives, the selection of the desired dive being effected by short, successive pressures on the same push button and the return to the time mode being preferably automatic or obtained again by long pressure on the push button. In this case, the LCD screens 14, 15 are preferably actuated, at the time of the selection, in order to display data which permits identification of the selected dive, such as the date and time of its start. At the same time, the minute and hour hands can be controlled in order to display respectively the maximum depth attained during the selected dive and the duration of said dive, for example.

It is obvious that the person skilled in the art will be able to program the watch dependent upon the control sequence that he will want to implement in the watch according to the invention, such as successive or combined operations on one or more of the control members.

In order to implement this historical mode, means are provided for controlling the hour hand 11 and the minute hand 12 such that they reproduce at an accelerated rate the situations that they respectively showed during the last dive. It is possible for example to program the electronic circuits of the watch in order that a minute of the last dive is reproduced within a second in the historical mode.

The historical mode is of major interest in matters of safety, since it permits quick visualisation of the profile of the last dive which comprises extremely important information for a doctor who is called subsequent to a diving accident. Normally, a doctor can effect visualisation of the dive profile by transfer of data from a diving computer to a reading and processing terminal, possibly of the personal computer type. The historical mode according to the present invention bestows an advantage over the devices from the state of the art in terms of quick access to this information.

Furthermore, the advantages disclosed earlier, concerning the readability of the diving watch 1 according to the invention, likewise apply to the use of the historical mode. The visualisation of the profile of the last dive is indeed quite easy from observation of the displacement of the hour hand 11 and of the minute hand 12 at an accelerated rate. It is in particular very easy to note a possible non-observance of a decompression stage by observation of the relative positions of the hour hand 11 and of the minute hand 12, in particular in the ascent phase, for the aforementioned reasons.

On the other hand, there can likewise be provided an adaptation of the graduations of times and depth dependent upon the respective values of the duration and of the depth of the reproduced dive. Such a disposition permits display, with good readability, of parameters relating to a dive without breathing apparatus, for example. In this latter case, it is possible to program the watch according to the invention in order that the display is made in real time and in order that a depth variation of 1 meter is represented by a variation of ten minutes on its dial. It is obvious that these values are only given here by way of indication and the person skilled in the art can modify them without encountering any particular difficulties.

Obviously additional information can be provided on the LCD screens 14 and 15 in the historical mode, such as the maximum depth attained in the corresponding dive or the particulars of any alarms occurring in the course of the latter, for example.

Figure 4:
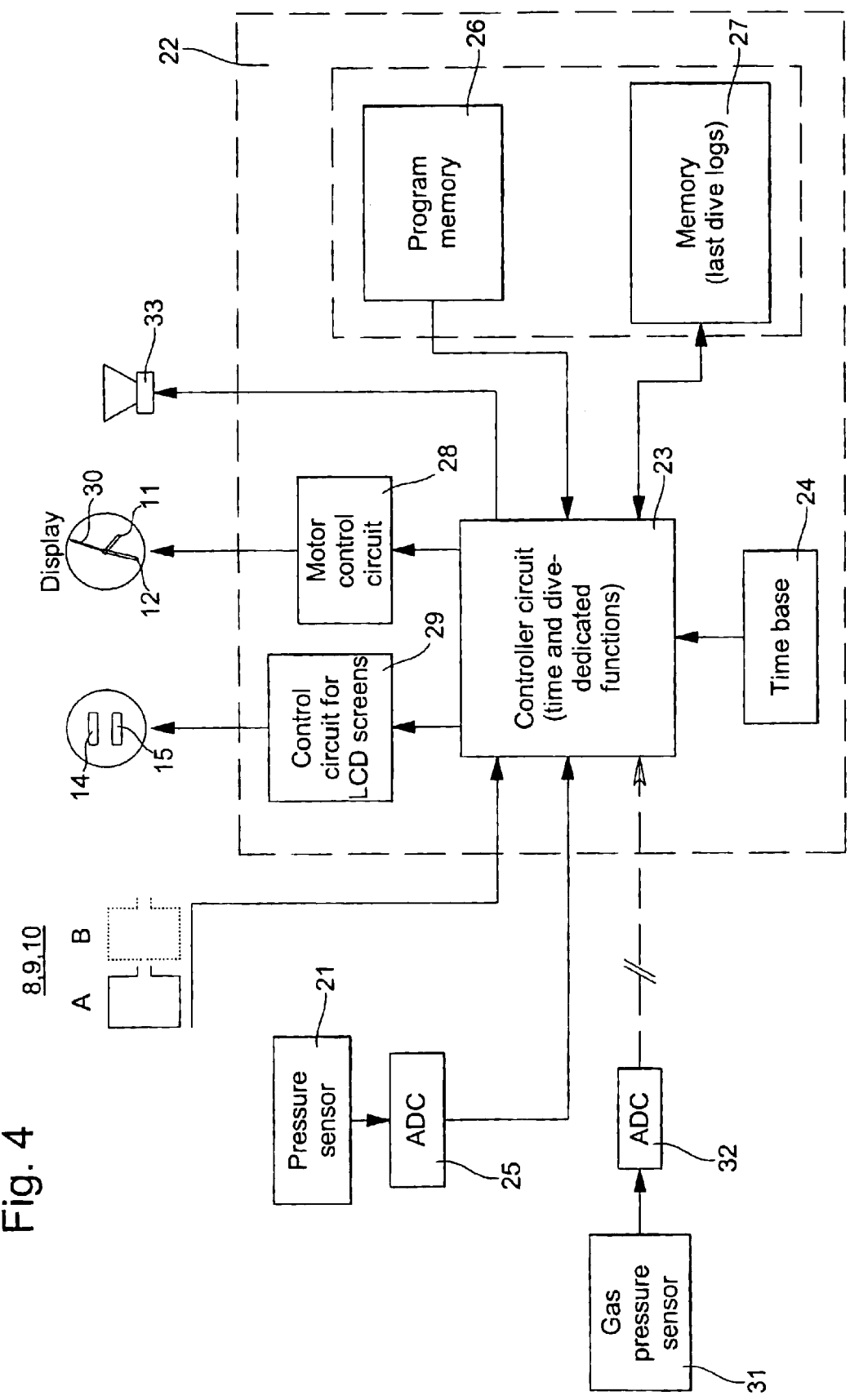
FIG. 4 is a general schematic diagram of the electronic circuit of the diving watch according to the present invention.

FIG. 4 is a schematic diagram of the general structure of the electronic circuits of the diving watch 1 according to the present invention.

Generally, the electronic circuit of the watch comprises in particular an integrated circuit 22 comprising a controller circuit 23 which is able to operate the conventional time functions of the watch 1, comprising, with this object, a circuit for division of the time and in particular linked to a resonator 24 which supplies a time base. From this time base, temporal information is produced by the controller circuit 23, in particular in order to ensure the functions of the time mode and the functions dedicated to the diving mode.

Furthermore, the controller circuit 23 receives signals which are produced by the pressure sensor 21 which is generating analog electrical signals representative of the surrounding pressure. These signals pass through an analog to digital converter 25 before being supplied at the input of the controller circuit 23 in the form of a digital signal.

The pressure sensor 21 is of a conventional type and the person skilled in the art will have no particular difficulty in choosing one which is adapted to the implementation of the present invention.

The integrated circuit 22 likewise comprises memory zones, in particular a first memory zone 26, preferably of the non-volatile type, which contains a program permitting the controller circuit 23 to effect calculations relating to the diving mode, on the basis of a decompression algorithm. The choice of a reprogrammable non-volatile memory (Flash or EEPROM, for example) possibly permits subsequent modification of the calculation program dependent upon the adopted decompression algorithm. The integrated circuit 22 comprises in a preferred manner at least a second memory zone 27, likewise of the non-volatile type, in which the measurements and the results of the calculations effected by the controller circuit 23 are periodically stored. This second memory zone 27 is in particular provided in order to store the depth measurements and the corresponding temporal measurements relating to the last dive(s) as the case may be. Thus, this information is consulted by the controller circuit 23, in particular when the watch is in the historical mode.

From the respective input signals, the controller circuit 23 determines the situation and the state of the diver continually, from the point of view of the practise of diving. With this object, it can in particular be provided that, in the time mode, a measurement of pressure is effected every five minutes and that, in the diving mode, a measurement of pressure is effected every two seconds, for example. From all these periodic measurements, and on the basis of the program stored in the first memory zone 26, the controller circuit 23 determines what the physiological state of the diver is, i.e. a certain number of parameters which are relevant for his health, such as in particular, the residual ratio of nitrogen dissolved in his body, the quantity of micro-bubbles formed, the CNS % corresponding to a measurement of the absorption of oxygen at a partially elevated pressure, an excess of which can cause a hyperoxy.

The person skilled in the art will have no difficulty in programming the controller circuit 23 in order to permit a display of these relevant parameters by at least one of the LCD screens 14, 15, this display being possibly automatic, when its relevance justifies it, or controlled by one or more operations, successive or combined, on one or more push buttons 8 to 10.

The decompression algorithm is preferably stored in the first memory zone 26, in the form of a computer program. Its use, on the basis of measured and/or calculated information permits the controller circuit 23 to calculate the value of the maximum remaining duration of the dive in progress, before the diver would be obliged to effect a decompression stage during the ascent, and the altitude which is not to be exceeded. The controller circuit 23 then sends adapted signals to a control circuit 28 of bidirectional drive means, such as bidirectional motors for example, such that the hour hand 11 displays the altitude which is not to be exceeded opposite the two first zones 18 and 19 of the additional graduations. Likewise, the controller circuit sends adapted signals to a control circuit 29 of the LCD screens 14 and 15 such that the LCD screen 14, for example and according to FIG. 1, displays the maximum remaining duration before having to effect a decompression stage during the ascent. Furthermore, the controller circuit 23 produces adapted signals for the control circuit 28 of the bidirectional motors such that the minute hand 12 displays the momentary depth, opposite the first graduations 16 which are placed on the bezel 7 of the watch. Insofar as it is provided that the pressure sensor 21 effects measurements of the surrounding pressure constantly, in a periodic manner, that the user of the watch is either diving or at the surface, the data supplied to the controller circuit 23 in order to effect the calculations on the basis of the decompression algorithm are adequate to ensure satisfactory accuracy of the results. Thus, the dives which are possibly implemented close together are likewise taken into account in order to evaluate the physiological state of the diver. Likewise, if the user of the watch places himself at altitude in order to dive in a lake above the sea level, he undergoes low surrounding pressures and is in a phase of progressive desaturation. Thus in the first instance, his physiological state, which is not completely adapted to the surrounding pressure, is taken into account by the watch according to the present invention as well as the initial state, since the measurements taken during this short period of ascent by the pressure sensor 21 are likewise integrated into the use of the program of the watch, the algorithm which is used taking such parameters into account.

For this reason, an additional advantage of the diving watch according to the invention occurs by virtue of its design. Indeed, by virtue of its discreet appearance, which is not generally the case for diving computers, the present watch can be worn under any circumstances and thus permanently. Thus, its user is not required to anticipate a future dive to wear the watch, with the object of ensuring monitoring of the pressures undergone before diving, insofar as he can wear it permanently without making any aesthetic concessions.

From information or data recovered in this way, the controller circuit 23 calculates the minimum pressure to which the diver can be subjected dependent upon his physiological state. When this pressure is less than the surface pressure of the water level at which the dive in progress is taking place, the controller circuit 23 defines a value for the maximum remaining duration before the need to effect a decompression stage.

In the reverse case, when the minimum pressure to which the diver can be subjected is greater than the surface pressure, the diver must effect at least one decompression stage during his ascent, according to the decompression algorithms which are commonly used currently. The parameters of these decompression stages, i.e. their respective depths and durations, are thus calculated by the controller circuit 23, on the basis of the algorithm which is used, and are indicated by the hour hand 11, as described earlier.

Furthermore, the electronic circuits of the watch comprise conventional means for detecting actuations of the push buttons 8 to 10 by the user which will not be described in detail.

On the other hand, it may be noted that in practice every dive must normally comprise a stage, termed a comfort or safety stage, at a few meters depth, generally at 5 meters and for several minutes, generally 3 minutes, even in the absence of risks related to the phenomenon of decompression.

According to a preferred embodiment, the program stored in the memory zone 26 can comprise a part provided in order to enforce by default observation of this safety stage, by indicating to the diver when he effects his ascent, via the controller circuit 23 and the control circuit 28, to stop at a predefined depth for a predefined time before being able to resurface, by means of the hour hand 11.

The structure of the electronic circuit of the diving watch 1 according to the present invention will not be dealt with in more detail insofar as it does not constitute the core of the invention. Furthermore, numerous embodiments are available in the documents of the prior art and the person skilled in the art will have no difficulty in obtaining them.

Figure 5:
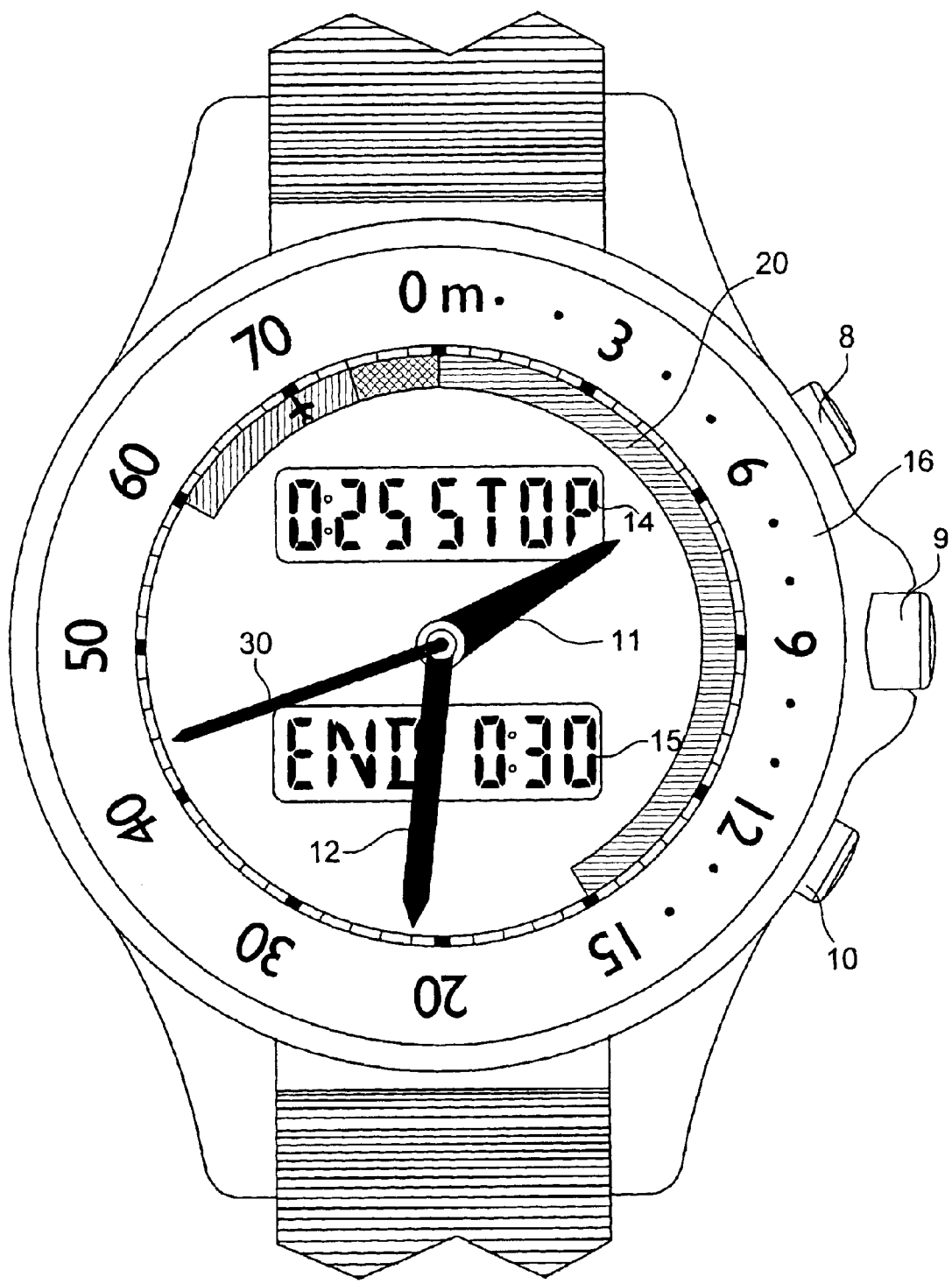
FIG. 5 is a front view of the diving watch in a variant of the embodiment presented in the preceding Figures.

The implementation of an advantageous variant of the watch which has just been described can be provided by the use of a third analog display organ, preferably a third hand. A possible embodiment of this configuration is illustrated in FIG. 5, in which the hand 30 is controlled in order to indicate the seconds in the time mode, by way of example. The presence of this third hand 30 can thus be advantageously used in order to provide additional indications to the user of the watch in the diving mode.

In the diving mode, it can be provided for example to control the third hand 30 in order that it indicates a depth which is not to be exceeded by the diver, calculated from the CNS % mentioned earlier. Thus at any moment in time, the minute hand 12, which indicates the momentary depth, must be situated between the hour hand 11 and the second hand 30. In an alternative or complementary manner, it can be provided that the hand 30 indicates the rate of ascent with respect to the first graduations 16 when the diver begins the ascent from the dive, in order that he does not exceed the recommended rate of ascent.

There can likewise be provided the implementation of an advantageous variant in which the hand 30 gives an indication to the diver relating to the autonomy for the dive in progress. The implementation of this variant requires the addition of additional constructional elements with respect to the previously described embodiment, the constructional fundamentals remaining the same. Thus, the additional technical elements have been illustrated in FIG. 4.

In particular, there can be provided means for measuring the gas pressure in the cylinder of the diver, so as to be able in particular to calculate the corresponding autonomy and to display it possibly by means of one of the LCD screens 14, 15. These means are conventional and are for example described in U.S. Pat. No. 4,882,678. It is possible in particular to use a piezoelectric sensor 31 (FIG. 4) which is connected to the outlet of the gas cylinder in order to measure the pressure thereof, and delivers an analog output signal which is subsequently processed by an analog to digital converter 32 before being supplied to the input of an electronic circuit (not illustrated). For example, it can be provided that the latter is a wireless modulation and transmission circuit and able to communicate with a receiving circuit (not illustrated) which is situated in the watch and able to supply the received signal to the controller circuit 23. A transmitter-receiver system in an electronic device for a diver is described in U.S. Pat. No. 4,949,072. The person skilled in the art will be able to consult the two patents which have just been mentioned in order to get details of implementation of these techniques which will not be further dealt with in the scope of the present invention.

The algorithm which has served as the basis of the calculation program stored in the memory zone 26 preferably integrates picking up the gas pressure in the cylinder of the diver with the object of calculating the autonomy, almost in real time. It is obvious that alternatively an additional algorithm can be provided which is dedicated in particular to autonomy calculations.

The controller circuit 23 processes the signals which are representative of the gas pressure in the cylinder by means of the algorithm and deduces therefrom the autonomy of the cylinder in terms of the remaining diving time.

An additional advantage of the present invention arises from the fact that the remaining diving time is not directly displayed by the watch. Indeed, the controller circuit 23 calculates, always on the basis of the algorithm, what the maximum depth accessible to the user of the watch is, dependent upon the remaining diving time. This calculation is effected taking into account in particular the physiological state of the diver, i.e. in particular parameters of the dive in progress and respective durations of possible decompression stages which he will have to observe during the ascent. It is furthermore preferable to provide a safety margin in the calculation of the remaining diving time in order to anticipate a lack of attention by the user. For example, a margin of 10% in the gas pressure in the cylinder can be used, in other words, it is possible to systematically subtract 10% of the initial value of the gas pressure from the measurements effected during the course of the dive.

The controller circuit 23 produces, from the measurements of gas pressure which are obtained, signals adapted for the control circuit of the motors 28 which, in the present variant, controls a third bidirectional motor which drives the second hand 30, in order that it indicates the value of the maximum depth accessible to the diver, in relation to the first graduations 16.

Thus there is obtained a novel synergy effect insofar as the diver knows in the course of the dive that the minute hand 12, which indicates his depth, must be situated between the hour hand 11, which indicates the minimum depth to which the diver must ascend for decompression reasons, and the second hand 30, which indicates the maximum depth which is accessible for breathing gas autonomy reasons. It may be said, in other words, that the minute hand 12 must not pass the second hand 30 during the descent, while it must not pass the hour hand 11 during the ascent. Thus there pertains again the same ease of reading, by comparison of the relative positions of the three hands in the present variant, as in the case of only two hands.

It can likewise be provided that one of the LCD screens 14 or 15 is controlled by the controller circuit 23, via the control circuit 29, in order to display, by default or in response to an action on one of the push buttons 8 to 10, the value of the remaining diving time. Such a situation has been illustrated in FIG. 5, the display of the remaining time being produced by the LCD screen 15.

Means can be used which are able to fulfil the functions of one or more alarms, in the watch according to any of the previously described variants, in particular by providing an acoustic transmitter such as a piezoelectric element 33 (FIG. 4) which is controlled by the controller circuit 23. There can then be provided different operating frequencies or signal sequences in order to indicate different respective situations, such as exceeding the maximum accessible depth, exceeding the minimum depth during the ascent, or even a rate of ascent which is too quick.

The preceding description corresponds to preferred embodiments of the invention and should not be considered as restrictive in any instance, insofar as it relates more particularly to the described structure for the watch, the described functions, the nature and the number of the control members and of the LCD screens which are used, the adopted colours or even the placing of the graduations. In particular, variants are conceivable in which the diving watch according to the present invention comprises additional functions such as a compass or thermometer function. Likewise, the invention is not limited to the described operating modes and means adopted for their respective actuations insofar as these parameters can be modified by a suitable program of the controller circuit. The person skilled in the art will encounter no particular difficulty in adapting the functioning of the watch according to the present invention to his own requirements.

What is claimed is:

1. An electronic diving watch comprising a sealed housing containing a clock movement which is surmounted by a dial, the watch comprising at least first graduations, said clock movement comprising electronic circuits which are able to produce time signals intended for motor means which control respectively at least a first and a second analog display organs, said display organs being disposed above the dial in order to display the current time in a first time operating mode, the watch comprising furthermore a pressure sensor which is able to produce electrical signals which are representative of the surrounding pressure and to supply said signals to said electronic circuits, the diving watch having at least a second operating mode, or diving mode, in which a display of data relating to the practise of diving is provided, wherein said first graduations serve in particular for indicating a depth, wherein said electronic circuits comprise first means which are able to control the first display organ, in said diving mode, in order to indicate the depth in conjunction with said first graduations and, wherein said electronic circuits likewise comprise second means which are able to define almost continually a minimum depth which is not to be exceeded by a wearer of the watch during the ascent from a dive, calculated from a substantially continuous decompression algorithm, and to control said second display organ in order to indicate said depth which is not to be exceeded in conjunction with said first graduations substantially in real time.

2. The watch according to claim 1, wherein said second means are furthermore able to define discontinuous decompression parameters comprising at least one stage to be effected during the ascent from a dive, calculated from said algorithm, a stage being in particular defined by its depth and its duration, and to control sequentially said second display organ, in said diving mode, in order to indicate, in the first instance, the depth of the stages to be effected during the ascent in conjunction with said first graduations and in order to indicate, in the second instance, that the diver can resurface.

3. The diving watch according to claim 2, wherein said electronic circuits comprise an integrated circuit which comprises in particular a time base and is able to define the respective depths and durations of said decompression stages which are to be effected, in particular from signals which are generated by the pressure sensor, the integrated circuit being furthermore able to effect a measurement of the time interval when the momentary depth attains and maintains itself at a value which is equal to the depth defined for one of said stages and to control said second display organ in order to indicate the depth of a following stage if the effected time interval measurement has attained a value at least equal to the duration defined for said stage.

4. The diving watch according to claim 2, further comprising additional graduations comprising at least a first zone in conjunction with which said second display organ is able to indicate to the wearer of the watch that his body is undergoing physiological modifications, due to the practise of diving, with respect to his normal state.

5. The diving watch according to claim 4, wherein said first graduations comprise a second zone which preferably has a different visual appearance to that of said first zone, said second means being able to control said second display organ in order to indicate furthermore to the wearer of the watch, in conjunction with said second zone, that his body is undergoing significant physiological modifications linked to the practise of diving.

6. The diving watch according to claim 5, wherein said first and second zones extend over a sector which has an angular opening at the top of at least 15 degrees, preferably 30 degrees, and wherein said electronic circuits comprise additional means in order to control said second display organ, in the diving mode, in order to indicate an altitude which is not to be exceeded, in conjunction with the graduations which are situated in said first and second zones, said altitude depending upon said physiological modifications which are undergone by the body of the wearer of the watch.

7. The diving watch according to claim 2, further comprising at least one control member, the movements of which are detected by said electronic circuits, and wherein these latter are able to control at least said first display organ, in the diving mode, in order that it indicates the maximum depth attained during a dive in progress in response to an action on said control member.

8. The diving watch according to claim 2, wherein said electronic circuits are able to control said second display organ, in order to indicate at least one stage with predefined duration and depth, during the ascent, in conjunction with said first graduations.

9. The diving watch according to claim 2, wherein means are provided in order to detect the start of a dive and to automatically actuate the diving mode.

10. The diving watch according to claim 2, wherein the first and second analog display organs are respectively a minute hand and an hour hand.

11. The diving watch according to claim 2, further comprising additional means which are able to control at least a first liquid crystal screen in order to display in particular at least a first piece of information relating to the practise of diving, which information is complementary to information which is supplied by said first and second display organs.

12. The diving watch according to claim 11, wherein said additional means are likewise able to control at least a second liquid crystal screen in order to display at least a second piece of information relating to the practise of diving, which information is complementary to information supplied by said first and second (11) display organs.

13. The diving watch according to claim 2, wherein, when it comprises at least one control member, means are provided in order to actuate an additional operating mode, or historical mode, in response to a first action on said control member, from the time operating mode, in which each of said display organs reproduces its actions from the last dive with graduations of time and depth which are adapted to the parameters of said dive.

14. The diving watch according to claim 13, wherein the electronic circuits are able to store the parameters of at least the last two dives, to select the parameters of one of said last dives in response to at least a first action on a control member and to actuate said corresponding historical mode in response to at least a second action on a control member.

15. The diving watch according to claim 14 when it is dependent upon claim 11 or 12, wherein the electronic circuits are able to control at least one liquid crystal screen in order to display at least identification data of that of said last dives which has been selected for said historical mode.

16. The diving watch according to claim 15, wherein the electronic circuits are able to control said liquid crystal screen in order to display furthermore information relating to the practise of diving, which information is complementary to information indicated by said display organs in the historical mode.

17. The diving watch according to claim 2, further comprising a third analog display organ, the electronic circuits of the watch being able to control said third display organ in order that it indicates opposite said first graduations, in the diving mode, information relating to a depth, which information is complementary to information indicated by said first and second analog display organs.

18. The diving watch according to claim 17, wherein it comprises furthermore means for measuring the gas pressure in the cylinder of the user of the watch, the electronic circuits being able to calculate, in particular from said gas pressure measurement, the remaining autonomy substantially in real time and to deduce therefrom a depth value which is not to be exceeded by the user, said electronic circuits being able to control said third display organ in order that it indicates the value of said depth which is not to be exceeded, in relation to said first graduations.

19. The diving watch according to claim 17, wherein said third display organ indicates the seconds in time mode.

20. A method of displaying decompression stages to be effected during the ascent from a dive on an electronic diving watch with an analog display, the watch comprising a sealed housing containing a clock movement which is surmounted by a dial, at least first graduations which serve in particular for indicating a depth, said clock movement comprising electronic circuits which comprise a time base and are able to generate time signals intended for motor means which control respectively at least a first and a second analog display organs, said display organs being disposed above the dial in order to display the current time in a first time operating mode, the watch comprising furthermore a pressure sensor which is able to produce electrical signals which are representative of the surrounding pressure and to supply said electrical signals to said electronic circuits, said electronic circuits likewise comprising memory means, in which in particular there is stored a computer program which is obtained on the basis of a decompression algorithm and is able to define at least a duration and a depth of at least one decompression stage, said electronic circuits being furthermore able to process in particular the signals which are generated by the pressure sensor in order to validate the observance of said stage(s) which is/are to be effected during the ascent, the diving watch comprising at least a second operating mode, or diving mode, in which a display of data relating to the practise of diving is provided, the process comprising in particular the steps comprising:

a) processing of the signals generated by said pressure sensor in relation to said time signals when they are representative of a dive, b) transmitting the results of said processing to said memory means, c) controlling said first display organ substantially in real time in order that it indicates the depth with respect to said first graduations, d) definining at least one stage to be effected during the ascent when the results of said processing by means of the algorithm which is used require it, a stage being in particular defined by its depth and its duration, e) controlling said second display organ in order that it is positioned opposite the indication of the first graduations corresponding to the depth of the first stage to be effected, f) controlling said second display organ when the results of said processing indicate that said stage has been effected correctly, in order that it is positioned opposite the indication of the depth of the following stage, in the case where there still remains at least one stage to be effected, before resuming step f), or in order that it is positioned opposite the additional graduations, which are placed on the dial, indicating to a wearer of the diving watch that he can resurface if the validated stage is the last stage to be effected.

21. The display method according to claim 20, when the diving watch likewise comprises at least one liquid crystal screen, wherein in step e), said screen displays furthermore the remaining duration of the stage in progress, said duration being displayed substantially in real time dependent upon the results of said processing.

22. The display method according to claim 20, wherein, when the results of said processing by means of the algorithm which is used do not define a decompression stage to be effected during the ascent, it is provided that a stage is displayed, termed a comfort stage, the duration and the depth of which have respectively predefined values, by resuming steps e) and f) as defined in claim 20.

* * * * *